US007827551B2

(12) United States Patent
Kulbak et al.

(10) Patent No.: US 7,827,551 B2
(45) Date of Patent: Nov. 2, 2010

(54) REAL-TIME THREADING SERVICE FOR PARTITIONED MULTIPROCESSOR SYSTEMS

(75) Inventors: Yoram Kulbak, Tel Aviv (IL); Doron Shamia, Modiin (IL); Jimmy Scott Raynor, Irmo, SC (US); James P. Held, Portland, OR (US); Ron Gabor, Raanana (IL)

(73) Assignee: Intel Corporation, Santa Clara, CA (US)

( * ) Notice: Subject to any disclaimer, the term of this patent is extended or adjusted under 35 U.S.C. 154(b) by 1440 days.

(21) Appl. No.: 11/231,697

(22) Filed: Sep. 21, 2005

(65) Prior Publication Data

US 2007/0067771 A1  Mar. 22, 2007

(51) Int. Cl.
G06F 9/46 (2006.01)
H04L 9/32 (2006.01)

(52) U.S. Cl. .................. 718/100; 718/102; 718/104; 718/107; 713/164; 713/166

(58) Field of Classification Search .......... 718/100, 718/102, 104, 107; 713/164, 166
See application file for complete search history.

(56) References Cited

U.S. PATENT DOCUMENTS 5,515,538 A    5/1996  Kleiman
6,662,289 B1 * 12/2003  Ang ................ 711/202
2004/0199919 A1 * 10/2004  Tovinkere ............ 718/102

OTHER PUBLICATIONS

Steinberg, "Fiasco μ-Kernel User-Mode Port", Dec. 19, 2002, Dresden University of Technology, Institute of System Architecture, pp. 1-37.*
Sun Microsystems Inc., "Scalable Real-Time Computing in the Solaris Operating Environment" [Online] 2000, pp. 1-32. www.sun.com/software/whitepapers/wp-realtime/wp-realtime.pdf.
Hewlett-Packard Company, "HP-UX Processor Sets—A Technical White Paper" [Online] Nov. 2001, pp. 1-26. http://docs.hp.com/en/5185-4322/5185-4322.pdf.
Obenland, Kevin M., "The Use of POSIX in Real-Time Systems, Assessing its Effectiveness and Performance" [Online] Sep. 21, 2000, pp. 1-16. www.mitre.org/work/tech_papers/tech_papers_00/obenland_posix/obenland_posix.pdf.
Mitre Corporation, Abstract of the Use of POSIX in Real-Time Systems, Assessing Its Effectiveness and Performance, [Online] Sep. 21, 2000, pp. 1-1.

* cited by examiner

Primary Examiner—Meng-Ai An
Assistant Examiner—Kenneth Tang
(74) Attorney, Agent, or Firm—Blakely, Sokoloff, Taylor & Zafman LLP

(57) ABSTRACT

An embodiment of the present invention is a technique to provide a real-time threading service to an application in a multi-core environment. An executive is launched, within a most privilege level of an operating system (OS), on a real-time core in the multi-core environment. The real-time core is sequestered from the OS. A real-time thread is created in a least privilege level on the real-time core for an application using a library. The library is loaded by the application. The real-time thread shares a virtual address space with the application.

17 Claims, 7 Drawing Sheets

REAL-TIME THREADING SERVICE FOR PARTITIONED MULTIPROCESSOR SYSTEMS

BACKGROUND

1. Field of the Invention

Embodiments of the invention relate to the field of operating systems, and more specifically, to real-time threads.

2. Description of Related Art

A Real-Time Operating System (RTOS) is an operating system (OS) that is developed for real-time applications. Typically, a real-time application requires a deterministic response time while interacting with a real-world environment.

An application developed under existing OS's does not have a complete dedicated and predictable environment free from constraints imposed by the underlying OS. It is either tuned to the specific hardware and software platform that it is running on or run within a segregated environment. The segregated environment may be a separate process in its own virtual address space on the same or another processor, often with an entirely distinct RTOS environment. The application has to interact with such a segregated environment through explicit messaging and data buffer exchange. This leads to inefficient utilization of resources and may cause non-deterministic response time.

BRIEF DESCRIPTION OF THE DRAWINGS

Embodiments of invention may best be understood by referring to the following description and accompanying drawings that are used to illustrate embodiments of the invention. In the drawings.

DESCRIPTION

Figure 1:
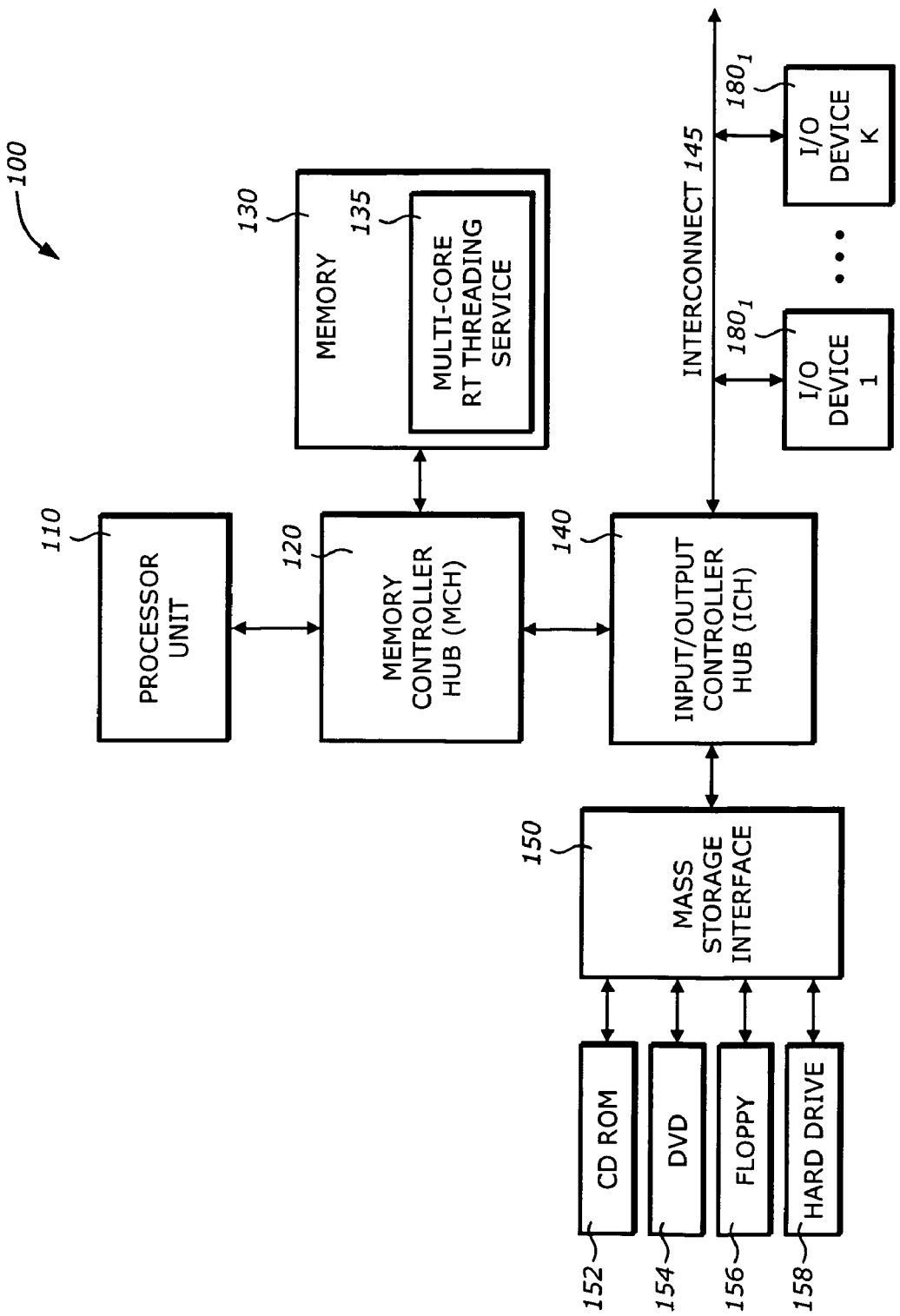
FIG. 1 is a diagram illustrating a system in which one embodiment of the invention can be practiced.

An embodiment of the present invention is a technique to provide real-time threading service to an application in a multi-core environment. The real-time cores are sequestered from the OS. A driver is launched within the kernel of the operating system (OS). An executive is launched by the driver to bootstrap and control the sequestered cores. A real-time thread is created for an application using a library on the OS. The library exposes user-level Application Program Interface (API) to communicate with the driver and the executive. The real-time thread shares a virtual address space with the application and is controlled by the executive and the driver.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

One embodiment of the invention is a technique to implement a real-time threading service for multi-core or multi-processor systems. The term "real-time" here refers to a deterministic time in response to real-world events or transactions. The threads are exposed at the user level. Therefore, they may be referred to as lightweight threads because the amount of contextual information to be saved is small. The threading service is provided to support a sequestered symmetric multi-core or multi-processor system (SMP) or a core multi processors system (CMP). A sequestered SMP/CMP platform is a multi-processor/multi-core system where the host OS is booted and aware of only some of the cores or processors. The rest of the processors are invisible to the OS. The invisible processors are also referred to as sequestered processors. A driver works together with an executive to allow the programmer to execute threads on sequestered cores/processors in a partitioned SMP platform from within the main OS via an API provided by a user-level library. The threading service also allows the programmer to use off-the-shelf and future multi-processor (MP) platforms to extend today's non-real-time OS's with real-time subsystems using a software model in which the sequestered processors share a unified virtual address space with the OS-visible ones. This allows for easy migration of existing code and rapid development of such OS extensions utilizing multiple cores to do useful work without yielding to limitations in existing OS's.

Elements of embodiments of the invention may be implemented by hardware, firmware, software or any combination thereof. The term hardware generally refers to an element having a physical structure such as electronic, electromagnetic, optical, electro-optical, mechanical, electromechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

FIG. 1 is a diagram illustrating a system 100 in which one embodiment of the invention can be practiced. The system 10 includes a processor unit 110, a memory controller hub (MCH) 120, a main memory 130, an input/output controller hub (ICH) 140, an interconnect 145, a mass storage interface 150, and input/output (I/O) devices $180_1$ to $180_K$.

The processor unit 110 represents a central processing unit of any type of architecture, such as processors using hyper threading, security, network, digital media technologies, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In particular, the processor unit 110 may have a multi-core or multi-processor architecture where there are multiple cores or processors operating in parallel.

The MCH 120 provides control and configuration of memory and input/output devices such as the main memory 130 and the ICH 140. The MCH 120 may be integrated into a chipset that integrates multiple functionalities such as graphics, media, isolated execution mode, host-to-peripheral bus interface, memory control, power management, etc. The MCH 120 or the memory controller functionality in the MCH 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented with dynamic random access memory (DRAM), static random access memory (SRAM), or any other types of memories including those that do not need to be refreshed. The main memory 130 may include multiple channels of memory devices Double Data Rate (DDR2) DRAM's. In particular, the memory 130 includes a multi-core real-time (RT) threading service 135. The multi-core RT threading service 135 provides an application a service to create and manage RT threads in a multi-core environment.

The ICH 140 has a number of functionalities that are designed to support I/O functions. The ICH 140 may also be integrated into a chipset together or separate from the MCH 20 to perform I/O functions. The ICH 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, etc.

The interconnect 145 provides interface to peripheral devices. The interconnect 145 may be point-to-point or connected to multiple devices. For clarity, not all of the interconnects are shown. It is contemplated that the interconnect 145 may include any interconnect or bus such as Peripheral Component Interconnect (PCI), PCI Express, Universal Serial Bus (USB), and Direct Media Interface (DMI), etc.

The mass storage interface 150 provides interface to a mass storage device that stores archive information such as code, programs, files, data, and applications. The mass storage device may include a compact disk (CD) read-only memory (ROM) 152, a digital video/versatile disc (DVD) 154, a floppy drive 156, and a hard drive 158, and any other magnetic or optic storage devices. The mass storage interface 150 provides a mechanism to read machine-accessible media. The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphic), network card, and any other peripheral controllers.

Figure 2:
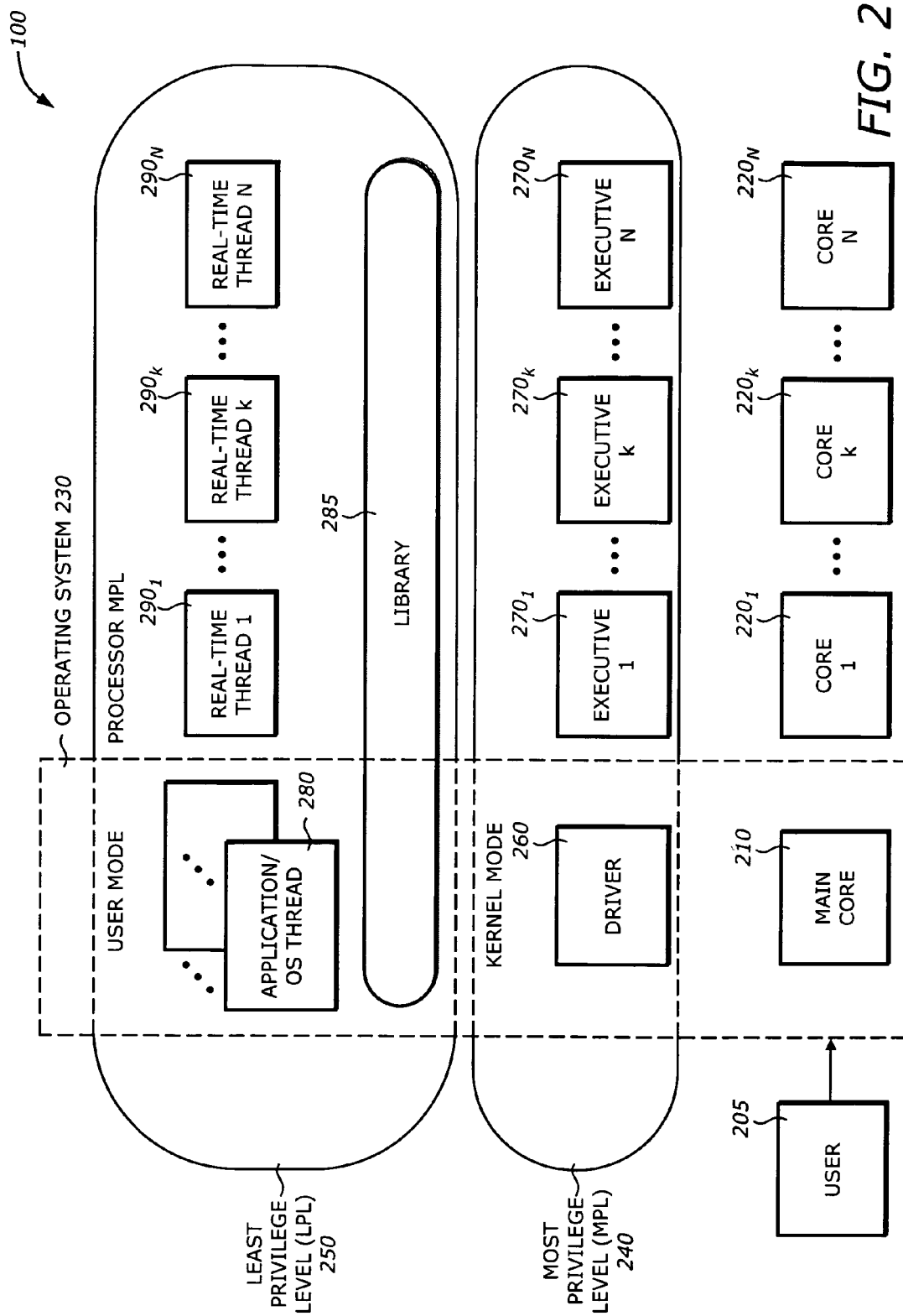
FIG. 2 is a diagram illustrating a multi-core real-time threading service according to one embodiment of the invention.

FIG. 2 is a diagram illustrating the multi-core real-time (RT) threading service 135 shown in FIG. 1 according to one embodiment of the invention. The multi-core RT threading service 135 includes a main core 210, N RT cores $220_1$ to $220_N$, an OS 230, a most privilege level (MPL) 240, and a least privilege level (LPL) 250.

The main core 210 is the core on which the OS 230 is loaded and runs. There may be more than one main core on which the OS 230 is running. The N RT cores $220_1$ to $220_N$ are the cores or processors that are sequestered by the Basic Input/Output System (BIOS) during boot-up, or they may also be sequestered by the OS 230. The N RT cores $220_1$ to $220_N$ are not visible to the OS 230. They may be referred to as lightweight cores to correspond to the lightweight threads running at the user level to be described later.

Upon boot-up by a user 205, the OS 230 is loaded and runs on the main core 210. The OS 230 supports partitioned symmetric multiprocessing (SMP) systems. In one embodiment, the OS 230 is the Microsoft Windows Server 2003 OS. It is contemplated that any other OS's that support partitioned MP may also be used. The OS 230 supports a hierarchy representing various privilege levels. The MPL 240 is the highest privilege level at which a kernel of the OS 230 runs. The LPL level 250 is the lowest privilege level where user applications or programs run. In one embodiment, the MPL and LPL 240 and 250 correspond to the kernel mode and the user mode, respectively, in the Windows Server 2003 OS.

The OS 230 has a driver 260, a library 285, and applications or OS threads, referred to as an application 280. The driver 260 is launched by the OS 230 when the OS 230 starts. Then, the driver 260 launches N executives $270_1$ to $270_N$, one for each core in the N RT cores $220_1$ to $220_N$. Each of the N RT cores $220_1$ to $220_N$ has its own instance of the executive. It is also possible to launch a single executive for all the RT cores. The driver 260 and the N executives $270_1$ to $270_N$ operate in the MPL 240. The application 280 is launched by the user 280 in the LPL 250. It loads a library 285. The application 280 then requests creating a RT thread such as the RT thread $290_k$ on the RT core $290_k$. Each of the N RT cores $220_1$ to $220_N$ may execute an RT thread on behalf of an OS application if requested. An RT core which does not execute an RT thread is considered idle. In other embodiments of the invention, a single RT core may execute several RT threads on behalf of a single OS application or several RT threads on behalf of several OS applications. The OS 230 does not operate on the cores $220_1$ to $220_N$. Therefore, the executive $270_1$ to $270_N$, and the RT thread $290_1$ to $290_N$ operate at the MPL and LPL 240 and 250 as supported by the core processors.

Figure 3:
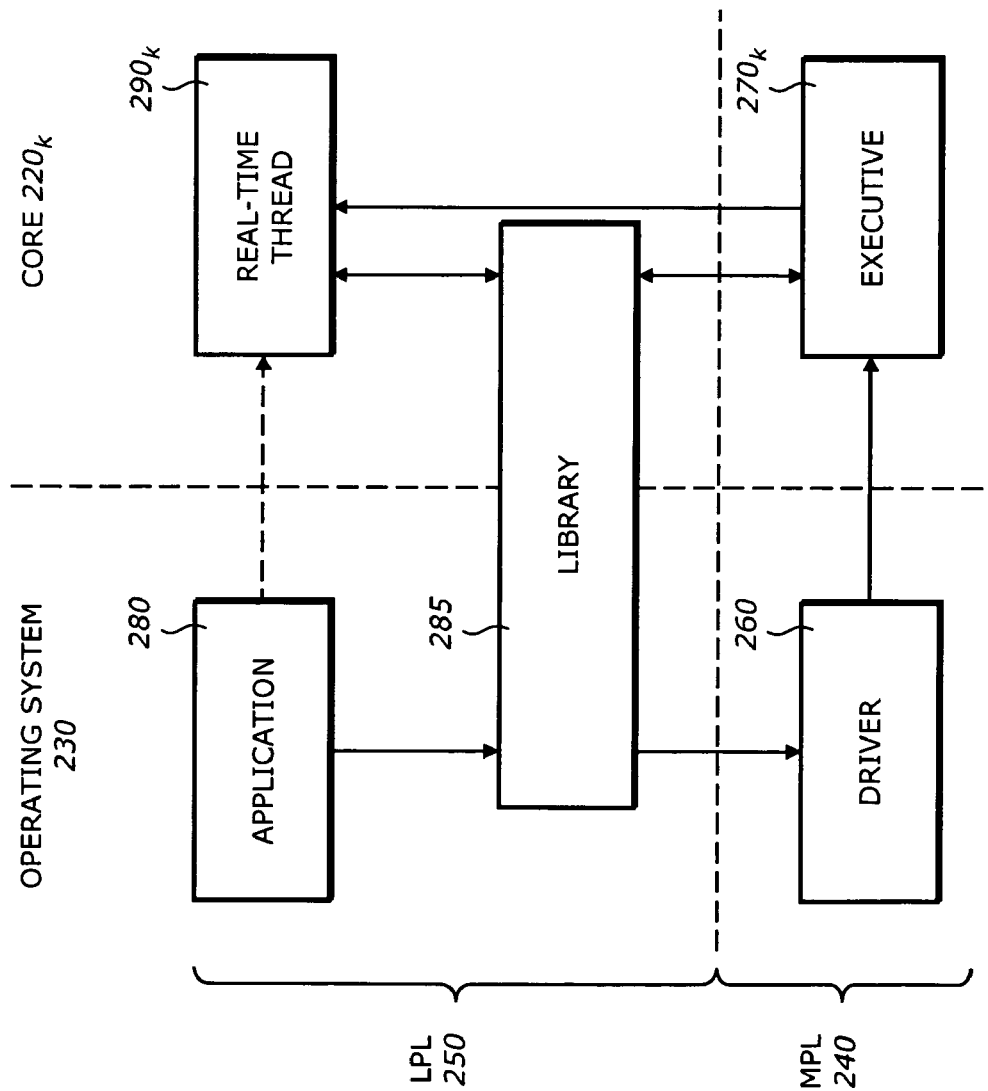
FIG. 3 is a diagram illustrating interactions of components of the real-time threading service according to one embodiment of the invention.

FIG. 3 is a diagram illustrating interactions of components of the RT threading service according to one embodiment of the invention.

As discussed above, the driver 260 and the executive 270 run in the MPL 240. The application 280, the library 285, and the RT thread $290_k$ run in the LPL 250. Collectively, these components form the multi-core RT threading service for sequestered SMP systems.

The driver 260 launches the executive $270_k$ on each available core $220_k$ upon start-up. It may launch, join, and kill a RT thread. It pins and unpins memory regions assigned to a RT thread or an application. It also maintains communication with all the executives.

The executive $270_k$ switches to and from the RT thread $290_k$. In other words, it performs transitioning tasks between the MPL and LPL 240 and 250, respectively. It also performs exception handling and other tasks such as pre-emption and signaling.

The library 285 is a dynamic link library that contains many useful functions to perform a number of tasks related to supporting the provision of the threading service. It proxies the services of the driver 260 from the main core 210 including launching and joining the RT thread $290_k$ and memory pinning. It also proxies the services of the executive $270_k$ including managing thread exit. In addition, it may perform any run-time tasks such as heap management, debug printing, and synchronization.

The application 280 uses the threading service to create threads which run on the RT cores or processors $220_1$ to $220_N$ shown in FIG. 2. For example, it uses the threading service to create the RT thread $290_k$. A RT thread creation starts with a call from the application 280 in the OS 230 to the library 285, requesting to create a RT thread. The call provides an entry point (e.g., function name) and an argument. The library 285 then requests the driver 260 to allocate a RT core from the N RT cores $220_1$ to $220_N$. The driver 260 goes through the N RT cores $220_1$ to $220_N$ to determine or find a core that is available to create a thread. Suppose core k is available. The driver 270 is then requested to pin down memory pages required for the correct operation of the RT thread. A message is then sent to the executive $270_k$ asking it to launch a RT thread on the core $220_k$. The executive $270_k$ then creates the RT thread $290_k$.

The executive $270_k$ sets up the page directory and tables to be a one-to-one map of the virtual address space of the application 280. It then switches to the LPL 250 and jumps to the user's entry point. When the RT thread $290_k$ exits or an external event (e.g., interrupt) occurs, the control returns back to the executive $270_k$. The executive $270_k$ then either services the event and returns control to the application 280 or cleans up and signals the driver 260 and the library 285 that the RT thread $290_k$ has finished executing. Most of the recoverable exceptions occurring during the execution of the RT thread $290_k$ may be dealt with by the executive $270_k$ such as calling a user defined handler as is done in the OS 230.

Figure 4:
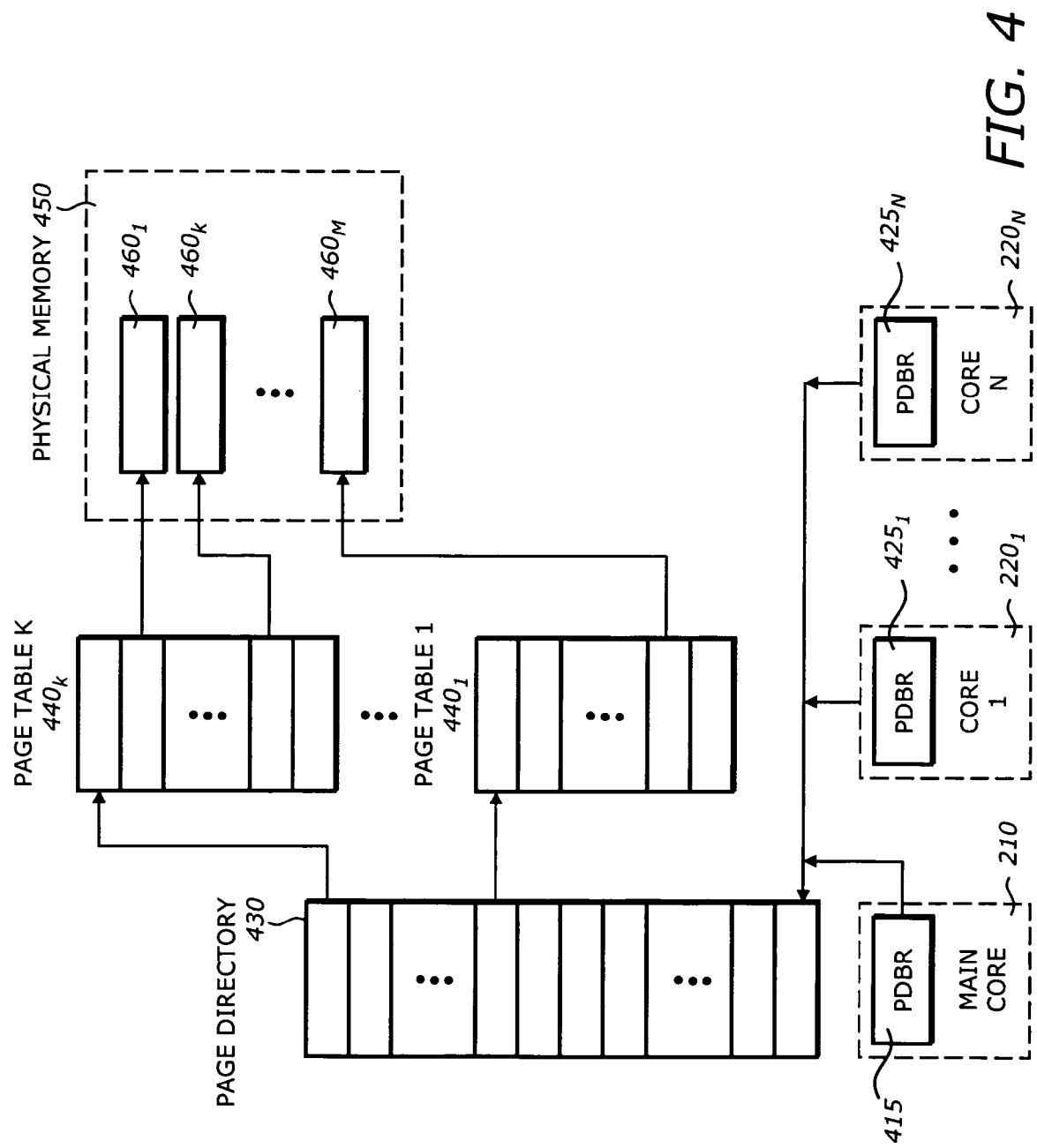
FIG. 4 is a diagram illustrating sharing of virtual address space according to one embodiment of the invention.

FIG. 4 is a diagram illustrating sharing of virtual address space by the RT thread according to one embodiment of the invention. The sharing of the virtual address space by the RT thread is realized via the sharing of the same page directory by the OS application and its real-time threads.

The main core 210 has a page directory base register (PDBR) 415 to point to a page directory 430. The cores $220_1$ to $220_N$ have PDBRs $425_1$ to $425_N$, respectively. Each application on the main core 210 has its own page directory. Page directories are part of the context of each application and as such are saved and restored on a context switch. When a RT thread is created and executes, the PDBR of the associated core is changed to the PDBR of the launching application. Alternatively, the PDBRs of the cores $220_1$ to $220_N$ may point to a copy of the page directory of a parent process that holds a subset of the parent process virtual address space. In this manner, the RT threads share the same virtual address space with the application that calls it.

The page directory 430 contains pointers to point to K page tables $440_1$ to $440_K$ according to the physical memory requirements of the application at that time. The page tables $440_1$ to $440_K$ point to corresponding pages $460_1$ to $460_M$ located in a physical memory 450.

In addition, memory pinning may be performed to ensure that the application pages used by the RT threads are not evicted by the OS memory manager. This may be accomplished using APIs provided in the OS kernel. The library 285 automatically pins code and data segments needed to execute the RT thread $290_k$. On-demand locking and paging may be used for efficiency.

Figure 5:
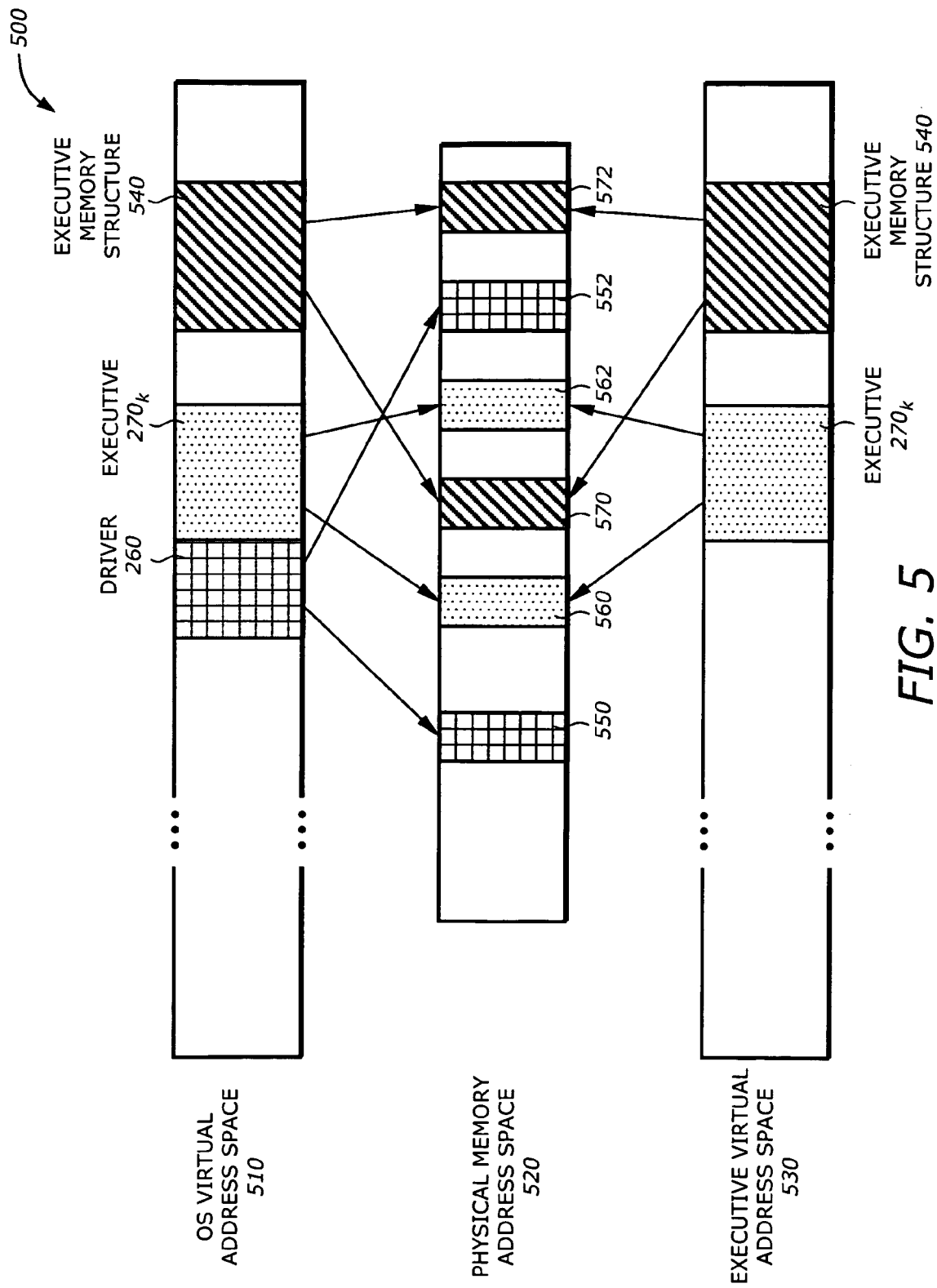
FIG. 5 is a diagram illustrating a virtual address space mapping according to one embodiment of the invention.

FIG. 5 is a diagram illustrating a virtual address space mapping 500 by the executive according to one embodiment of the invention. The mapping 500 illustrates the page directory for the executive $270_k$. All the executives use the same page directory. The page directory for the executive illustrated in FIG. 5 is different than the page directory for the RT threads as illustrated in FIG. 4. The RT thread page directory is assigned when the associated core is allocated to an application. On the other hand, the executive page directory is used while the core is not allocated yet. The mapping 500 includes an OS virtual address space 510, a physical memory address space 520, and an executive virtual address space 530.

The executive code is compiled as part of the driver 260 and therefore is loaded to a linear address greater than 2 Gigabyte (2 G). All the dynamic allocations are performed from the OS system heap which ensures that all the executive memory is protected from the user code and accessible only by kernel mode code. The executive page directory is a small, one-to-one subset of the OS system (>2 G) linear memory. It is used to map the structures that are required for the executive's correct operation. Examples of these structures are: the executive code and data, the Global Descriptor Table (GDT), the Interrupt Descriptor Table (IDT), the Advanced Programmable Interrupt Controllers (APIC) information, a heap or buffer of reasonable size (e.g., 64K), executive management structures, message buffers (e.g., memory pipes), and stacks.

The OS virtual address space 510 occupies the entire virtual address space as provided by the main core 210. It includes memory regions occupied by the driver 260, the executive $270_k$ and executive memory structures 540. The executive memory structures 540 may include the executive heap, the GDT, and the IDT. The physical memory address space 520 contains the memory regions mapped by the software components in the OS. All the memory allocations are done by the main core 210 (FIG. 2). The mapping to the executive page directory/page tables is done by pinning the pages and then the one-to-one copy of the physical/linear mappings from the OS page directory to the executive page directory. For example, the driver 260 may be mapped to the memory regions 550 and 552, and the executive $270_k$ may be mapped to the memory regions 560 and 562, the executive memory structures 540 may be mapped to the memory regions 570 and 572. The executive virtual address space 530 corresponds to the OS virtual address space 510 on a one-to-one mapping.

Figure 6:
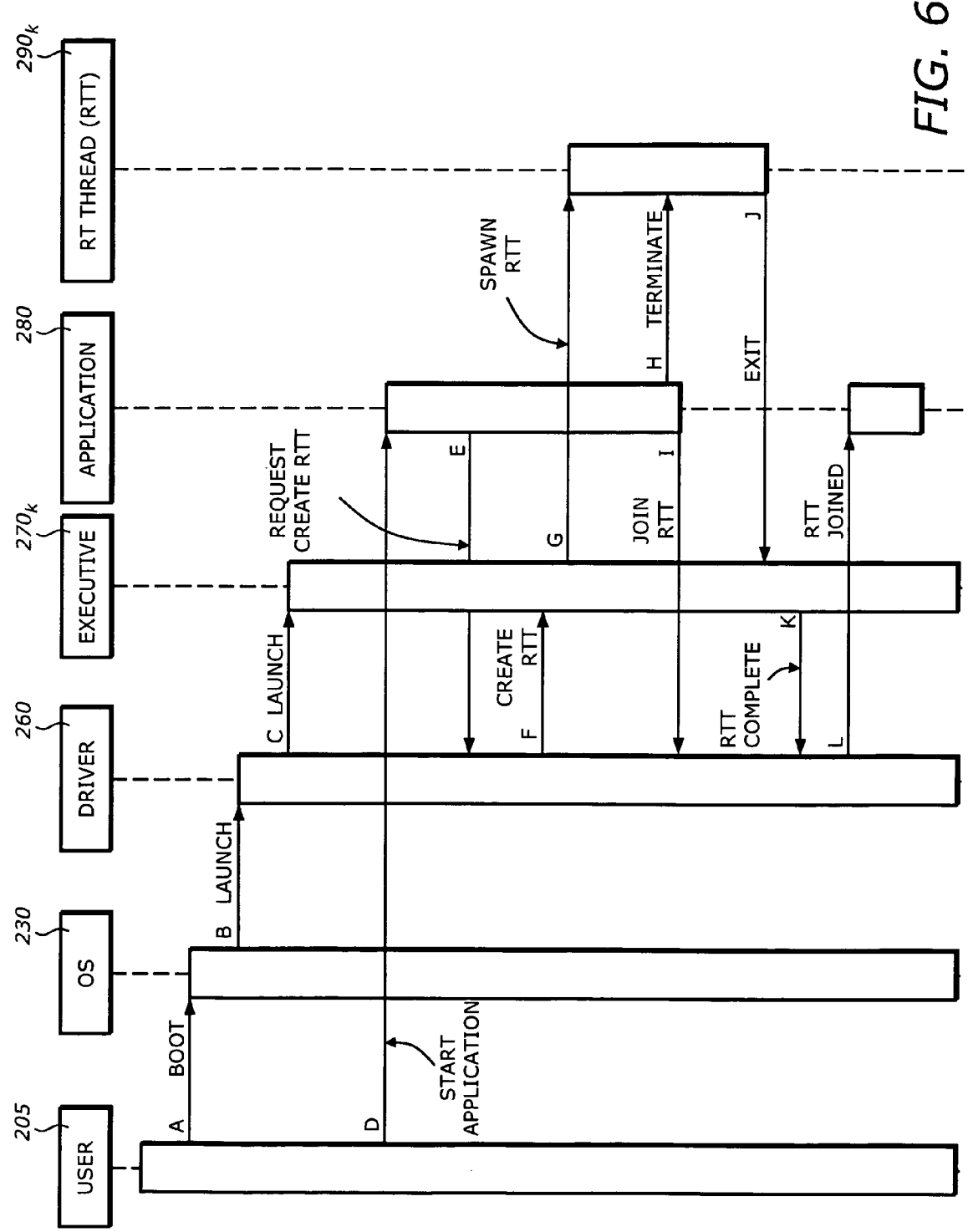
FIG. 6 is a diagram illustrating a sequence of real-time thread events according to one embodiment of the invention.

FIG. 6 is a diagram illustrating a sequence of RT thread events according to one embodiment of the invention. The sequence of the RT thread events involves the user 205, the OS 230, the driver 260, the executive $270_k$, the application 280, and the RT thread $290_k$. The sequence of the events is indicated by the time markers from A through L.

At the beginning, at time A, the user 205 boots up the system and the OS 230 is loaded. After initialization, at time B, the OS 230 launches the driver 260 in the kernel mode. At time C, the driver 260 launches the executive $270_k$ on all sequestered cores. At this time, the multi-core RT threading service 135 is up and running. At time D, after the executive $270_k$ is launched, the user 205 starts the application 280 that may use the multi-core RT threading service 135.

At time E, the application 280 requests creating a RT thread via the library 285. Appropriate structures are created and all relevant linear segments are pinned. The request is sent to the driver 260 via the library 285. The driver 260 verifies that an available core exists. At time F, the driver 260 sends a request to the executive $270_k$ on an available core k asking the executive $270_k$ to spawn a RT thread. At time G, the executive $270_k$ spawns the RT thread $290_k$ on the available core $220_k$. The RT thread $290_k$ is then running in the least privilege level 250.

At time H, the application 280 terminates the RT thread $290_k$ by using a shared variable to signal the RT thread $290_k$ to stop. At time I, the application 280 joins the RT thread $290_k$ to the driver 260 to ask the driver 260 to wait until the RT thread $290_k$ has actually stopped. At time J, the RT thread $290_k$ is terminated and exits via a library function call. The control is transferred to the executive $270_k$. At time K, the executive $270_k$ notifies the driver 260 that the RT thread $290_k$ is terminated. At time L, the driver 260 sends a signal to the application 280 to indicate that the RT thread $290_k$ has been joined. The driver 260 unblocks the application 280 to allow it to receive the RT thread exit status and continue to run. At this point, the application 280 has completed its use of the RT thread $290_k$.

Figure 7:
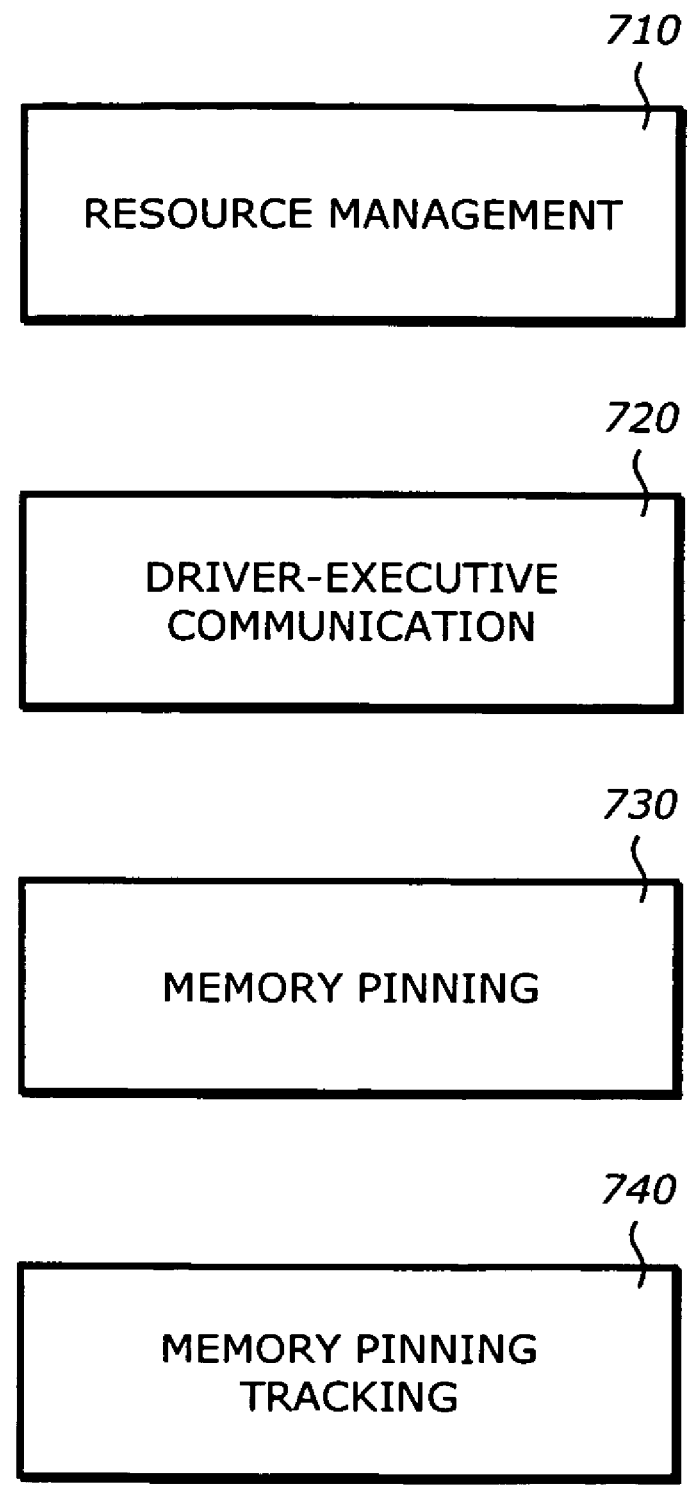
FIG. 7 is a diagram illustrating modules that support the real-time threading service in a multi-core environment according to one embodiment of the invention.

FIG. 7 is a diagram illustrating modules 700 that support the RT threading service in a multi-core environment according to one embodiment of the invention. The modules 700 include a resource management function 710, a driver-executive communication 720, a memory pinning function 730, and a memory pinning tracking 740.

The resource management function 710 is based on a mechanism that keeps track of the activities of the RT cores. In one embodiment, the driver maintains two lists. The first list includes all unallocated, or free, executives. The second list includes allocated executives for each user application that uses the RT threading service. Each time a RT thread is launched, the driver finds an available executive in the first list and moves that executive to the second list. If all the executives are allocated, the driver returns an error to the calling application. The lists are linked by a pointer in the executive header. At any moment, an executive belongs to exactly one list. With this list structure, additional or more complex resource management policies may be implemented.

The Driver-Executive communication 720 provides a communication mechanism between the driver and the executive. In one embodiment, the communication mechanism uses memory pipes. The pipes may be implemented using a cyclic memory buffer. The executive and the driver have their own pipe serving as an incoming message queue. A sender finds the appropriate message queue, writes the message to the queue, and signals the recipient to read its queue. Each memory pipe may have a lock to prevent multiple messages to be written to the queue simultaneously.

The memory pinning function 730 allocates and pins a memory region to the RT thread. This is done to ensure that the OS virtual memory manager does not page out the pages used by the RT threads. These pages may be pinned down by the driver using the memory manager services of the OS kernel. In one embodiment, the library automatically pins code and data segments needed to execute the RT threads. In the simplest approach, the process 930 may lock all the code and data segments loaded at the time the library is loaded, including the heap buffer. This simple approach may result in a large amount of memory that is pinned for every application. A more efficient approach may use on-demand locking and paging.

The memory pinning tracking function 740 is performed to provide the OS host process with a memory pinning service. The driver does not rely on the user application to free all its pinned regions before exit. By tracking the pinned regions, the driver may be able to perform any cleanup if necessary. The tracking may be performed by using a single linked list structure. In one embodiment, the Memory Descriptor List (MDL) in Windows 2003 OS is used. All the pinned memory regions from all the applications using the RT threading service are recorded in this single list. Access to the list may be protected by a mutual exclusion mechanism. When the driver 260 receives a notification from the library that the RT thread is terminated, the function 740 unpins the memory region. This may be done by traversing the list of the pinned buffers and unpinning any buffer which was allocated for the terminating RT thread.

Embodiments of the invention provide an efficient RT threading service for partitioned multiprocessor systems. The threading service provides the user an ability to run intense computations requiring real-time performance (e.g., media encoding) on a dedicated and predictable subsystem free from the arbitrariness and non-deterministic nature of the OS scheduler. The application and RT threads cooperate through a multi-threaded cooperation model and communicate through the same virtual address space, allowing easy development of new applications and easy migration of existing ones. Specifically, there is no need to pre-determine which part of the code executes on the OS and which part executes on the RT cores or processors. The computations may be done on both sides, allowing the OS threads to provide additional computational power on their spare cycles. In addition, the same code, without re-compiling, may run both on the OS and the RT cores. Finally, there are no packaging complications. There is no need to compile the same program for two OS's, or compiling two programs, one for each OS. The RT threading service requires only a standard OS (e.g., Windows) development environment.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
launching, within a most privilege level (MPL) of an operating system (OS), an executive on a real-time (RT) core in a multi-core environment, the RT core being sequestered from the OS; and
creating a RT thread in a least privilege level (LPL) on the RT core for an application using a library, the library being loaded by the application, the RT thread sharing a virtual address space with the application; wherein creating the RT thread comprises: receiving a create request from the library, the library passing the create request from the application; verifying that the RT core is available; and sending a spawn request to the executive, the executive spawning the RT thread on the RT core.

2. The method of claim 1 further comprising:
changing a page directory base register (PDBR) of the RT thread to point to a page directory of a parent process in the OS or a copy of the page directory holding a subset of a virtual address space of the parent process.

3. The method of claim 2 further comprising:
communicating with the application;
managing pinning memory regions used by the RT thread; and
communicating with the executive via a shared memory buffer.

4. The method of claim 3 wherein communicating with the application comprises:
receiving a wait request from the application to wait for the RT thread to stop;
receiving a signal from the executive indicating that the RT thread has stopped; and
unblocking the application to allow the application to receive an exit status from the RT thread.

5. The method of claim 3 wherein managing pinning the memory regions comprises:
pinning a memory region to the RT thread;
tracking the memory region;
receiving a notification from the library that the RT thread is terminated; and
unpinning the memory region.

6. The method of claim 1 further comprising:
managing resources on the multi-core environment.

7. An article of manufacture comprising:
a machine-accessible storage medium including data that, when accessed by a machine, cause the machine to perform operations comprising:
launching, within a most privilege level (MPL) of an operating system (OS), an executive on a real-time (RT) core in a multi-core environment, the RT core being sequestered from the OS; and
creating a RT thread in a least privilege level (LPL) on the RT core for an application using a library, the library being loaded by the application, the RT thread sharing a virtual address space with the application; wherein the data causing the machine to perform creating the RT thread comprises data that, when accessed by a machine, cause the machine to perform operations comprising; receiving a create request from the library, the library passing the create request from the application; verifying that the RT core is available; and sending a spawn request to the executive, the executive spawning the RT thread on the RT core.

8. The article of manufacture of claim 7 wherein the data further comprises data that, when accessed by a machine, cause the machine to perform operations comprising:
changing a page directory base register (PDBR) of RT thread to point to a page directory of a parent process in the OS or a copy of the page directory holding a subset of a virtual address space of the parent process.

9. The article of manufacture of claim 8 wherein the data further comprises data that, when accessed by a machine, cause the machine to perform operations comprising:
communicating with the application;
managing pinning memory regions used by the RT thread; and
communicating with the executive via a shared memory buffer.

10. The article of manufacture of claim 9 wherein the data causing the machine to perform communicating with the application comprises data that, when accessed by a machine, cause the machine to perform operations comprising:
receiving a wait request from the application to wait for the RT thread to stop;
receiving a signal from the executive indicating that the RT thread has stopped; and
unblocking the application to allow the application to receive an exit status from the RT thread.

11. The article of manufacture of claim 9 wherein the data causing the machine to perform managing pinning the memory regions comprises data that, when accessed by a machine, cause the machine to perform operations comprising:
pinning a memory region to the RT thread;
tracking the memory region;
receiving a notification from the library that the RT thread is terminated; and
unpinning the memory region.

12. The article of manufacture of claim 7 further comprising data that, when accessed by a machine, cause the machine to perform operations comprising:
managing resources on the multi-core environment.

13. A system comprising:
a main core having an operating system (OS), the OS supporting a most privilege level and a least privilege level;
a plurality of cores that are sequestered from the OS, the cores supporting the most and least privilege levels;
an application running in the least privilege level; and
a real-time (RT) threading service to allow the application to create a RT thread on a sequestered core, the RT threading service comprising:
a driver running in the most privilege level and launched by the OS, the driver controlling the RT thread,
an executive launched by the driver on the sequestered core and running in the most privilege level to spawn the RT thread, the RT thread sharing a virtual address space with the application, and
a library loaded by the application running in the least privilege level;
wherein the driver verifies that the sequestered core is available and sends a spawn request to the executive on the available sequestered core upon receiving a create request from the library.

14. The system of claim 13 wherein the executive changes a page directory base register (PDBR) of the RT thread to point to a page directory of a parent process in the OS or a copy of the page directory holding a subset of a virtual address space of the parent process.

15. The system of claim 13 wherein the driver unblocks the application to allow the application to receive an exit status from the RT thread after receiving a signal from the executive indicating that the RT thread has stopped.

16. The system of claim 13 wherein the executive pins a memory region to the RT thread, tracks the memory region, and unpins the memory region after receiving a notification from the library that the RT thread is terminated.

17. The system of claim 13 wherein the driver manages resources on the multi-core environment.

* * * * *